United States Patent [19]
Rummel

[11] Patent Number: 4,575,714
[45] Date of Patent: Mar. 11, 1986

[54] MODULE PRESENCE SENSOR

[75] Inventor: Paul W. Rummel, Kentfield, Calif.

[73] Assignee: Tegal Corporation, Novato, Calif.

[21] Appl. No.: 588,823

[22] Filed: Mar. 12, 1984

[51] Int. Cl.⁴ ............................................. G08B 21/00
[52] U.S. Cl. ............................... 340/568; 340/825.78;
 324/65 R; 364/130; 364/482; 364/483
[58] Field of Search ...................... 340/825.78, 825.79,
 340/568, 572, 537; 364/482, 483, 130; 324/65 R

[56] References Cited
U.S. PATENT DOCUMENTS
4,467,273 8/1984 Rudolph et al. .................. 324/65 R Primary Examiner—Glen R. Swann, III
Attorney, Agent, or Firm—Paul F. Wille

[57] ABSTRACT

In a processing system comprising a plurality of modules, the presence of one or more modules is sensed at a control unit through the use of an analog encoder and an A/D converter. The modules terminate selected resistors in a binary resistance network in the analog encoder to produce a unique signal via the A/D converter for each combination of modules in the system. The encoder requires a minimal number of signal lines and no multiplexing of signals.

6 Claims, 2 Drawing Figures

MODULE PRESENCE SENSOR

BACKGROUND OF THE INVENTION

This invention relates to computer controlled apparatus and, in particular, to sensing the presence of one or more modules in a modularly constructed apparatus.

The proliferation of computer control has lead to relatively fixed systems in order to simplify the control. In many applications, however, it is preferred to provide a control unit and one or more modules which can be selected at the option of the user. A problem arises in that the controller must "know" what components are attached to it. The brute force solution is to provide a different controller for each number and combination of modules. This is obviously inefficient to build and expensive to maintain.

The alternative to date has been to provide a local network over which the modules and the controller communicate. Such a system can be provided in one of several ways. A first is to provide a digital input for each module. Another is to multiplex signals to and from the various modules. A third is to send signals around a loop comprising the controller and the modules.

None of the alternatives is particularly easy to implement or inexpensive. Further, depending upon the equipment being controlled, timing may become critical. That is, these alternatives all require a finite service time for the controller. The time spent deciding which and how many modules are connected to the controller reduces the time the controller actually has to run the equipment.

A preferred embodiment of the present invention is described herein in the context of plasma reactors for use in the manufacture of semiconductor devices. It is understood that this is not the only use which can be made of the present invention.

Processing semiconductor wafers using a plasma involves somewhat of a dilmemma. Throughput is enhanced by batch processing the wafers. Control is improved by processing only one wafer at a time. One solution is to provide a plurality of processing stations, each taking a single wafer but working in parallel to increase throughput. However, some customers may not have the need or desire for parallel reactors while others may want to run several in parallel. Again, one can either build custom equipment for each market or adopt a modular approach wherein modules are cascaded to obtain the desired configuration. Further, modules can be mixed to obtain a closed system performing several distinct steps, e.g. etching, depositing, and stripping.

There is thus the problem of finding a way for the control unit to rapidly determine how many and what kind of modules are connected to it.

In view of the foregoing, it is therefore an object of the present invention to provide improved means for sensing the presence of a peripheral device by a computer.

Another object of the present invention is to provide means for sensing and identifying a peripheral device connected to a computer.

A further object of the present invention is to enable a computer to quickly sense and identify attached peripheral devices.

Another object of the present invention is to provide a field reconfigurable system which does not require reprogramming of a control unit.

A further object of the present invention is to provide a modularly constructed system which does not require different controllers for different arrangements of modules.

The foregoing objects and other advantages are obtained in accordance with the present invention wherein an analogue encoder comprises one input for each module. An analog to digital (A/D) converter is used by the computer to construct a digital signal representative of the attached modules. The analogue encoder comprises a binary weighted ladder resistance network. Modules are connected to the ladder, causing a unique signal to be generated for each combination of modules.

A more complete understanding of the present invention can be obtained by considering the following detailed description in conjunction with the accompanying drawings, in which:

DETAILED DESCRIPTION OF THE PREFERRED EMBODIMENT

Figure 1:
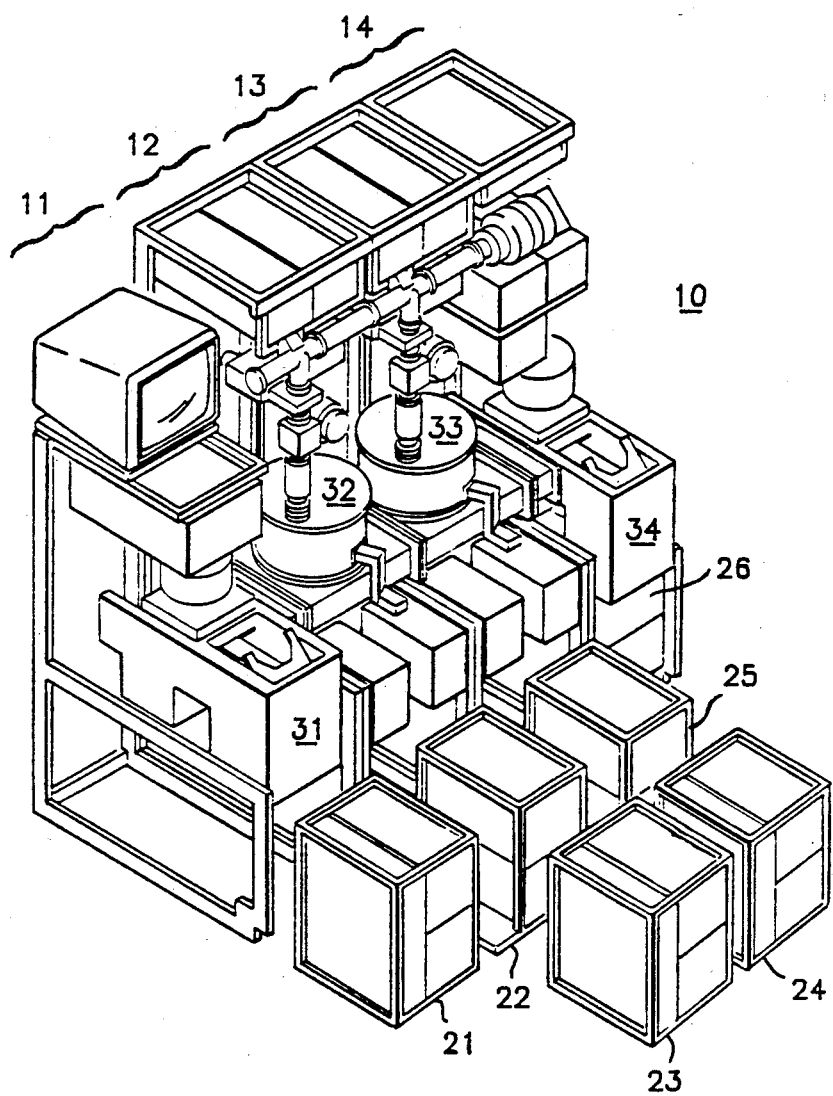
FIG. 1 illustrates a modular processing system incorporating the present invention.

FIG. 1 illustrates the particular use of the present invention in a modularly constructed plasma processing system. Plasma system 10, as illustrated in FIG. 1, comprises sections 11, 12, 13, and 14 arranged side-by-side in close proximity to each other. Section 11 comprises a master controller 21, which may for example include a microprocessor controller and appropriate power supplies, as well as a wafer transport mechanism 31 for introducing semiconductor wafers to the system. Sections 12 and 13 comprise a plurality of modules which can be identical, as illustrated in FIG. 1, or different from each other. Specifically, modules 22–25 comprise such elements as high frequency generators, bias power supplies, and slave microprocessor controllers. These items interface with respective plasma reactor chambers 32 and 33. In section 14, module 26 comprises, for example, gas flow control devices as well as interface circuitry for controlling wafer transport mechanism 34.

In one form of operation of the system illustrated in FIG. 1, chambers 32 and 33 can be operated in parallel, performing the identical process steps. In this mode, sections 12 and 13 are identical and are operated identically. Alternatively, sections 12 and 13 could perform sequential operations on a wafer. In the latter case, modules 22 and 25 or 23 and 24 may not be identical and would not be given the same process instructions to perform.

The system illustrated in FIG. 1 is intended to have a variety of possible configurations. For example, a minimal system comprises sections 11 and 12. In this form, wafer transport 31 provides unprocessed wafers for the system and receives processed wafers from the system. In larger versions of system 10, section 14 is added for receiving wafers. Additional intermediate sections, such as sections 12 and 13 are added as desired, depending upon the number of wafers to be processed simultaneously or the type of process to be carried out sequentially. In any event, it is apparent that the number and variety of modules to be controlled by module 21 varies considerably and the number of possible combinations is quite large. Thus, it is is highly desirable for module 21, with the master controller, to be able to identify what other modules, such as modules 22-26, are connected into the system.

Figure 2:
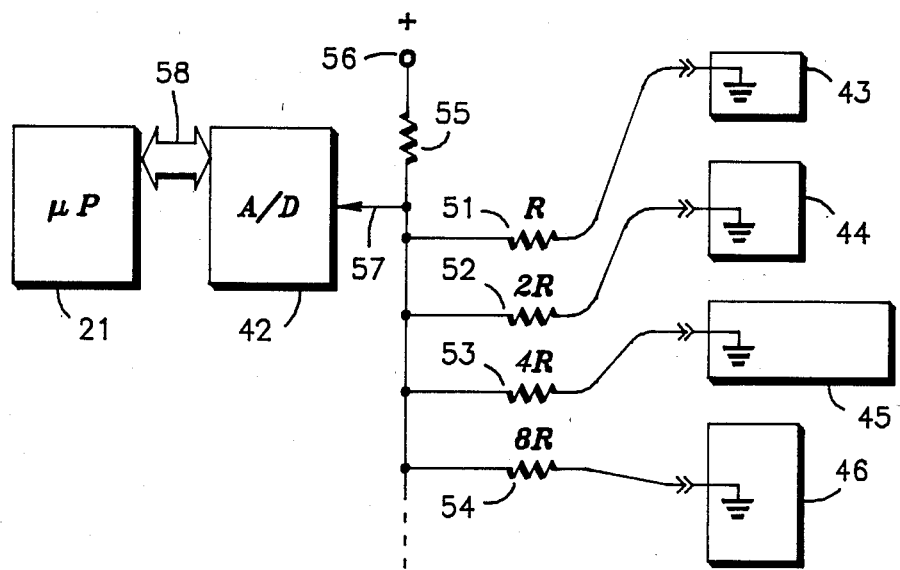
FIG. 2 illustrates a preferred embodiment of the present invention.

In accordance with the present invention, as illustrated in FIG. 2, module 21 can readily identify external modules through the use of an analogue encoding technique. Specifically, the master controller, illustrated in FIG. 2 by microprocessor 41, has connected thereto the output of analogue to digital converter 42. An input to analogue to digital converter 42 is connected through a resistance ladder network to modules 43-46. Modules 43-46 may be considered as corresponding to modules 22-26 or to sub-units within modules 22-26, depending upon the particular construction of the module.

In a preferred embodiment of the present invention, the resistance ladder network comprises a plurality of resistors, 51-54, having one end thereof connected in common and the other ends thereof connected to modules 43-46, respectively. The common ends are connected through a current to voltage converter 55 to a source of reference voltage 56. It is also preferred that current to voltage converter 55 comprise a resistor.

In order to uniquely identify each module, the analogue output signal from the ladder network to input 57 of converter 42 must have a unique value for each combination of modules connected to the ladder network. One way to obtain this result, although not the only way, is to require that the resistances of resistors 51-54 be related by powers of two. Specifically, as illustrated in FIG. 2, the resistance of resistor 52 is twice that of resistor 51 and, in turn, half that of resistor 53. Depending upon the number of resistors in the ladder network, one obtains a plurality of unique signals, one for each combination of modules. As illustrated in FIG. 2, wherein four resistors are used, up to 16 different combinations can be recognized by the master controller.

Typical converters which are presently commercially available have a resolution of at least twelve bits with sixteen bit resolution being obtainable. One could then, in theory, identify sixteen different modules in various combinations. As a practical matter, however, one must consider noise, whether from power supply 56 or induced in the leads from the high frequency signals surrounding the microprocessor, in selecting the resolution and voltage change for indicating the presence or absence of a module. For example, assuming sixteen resistors were used in the ladder network, converter 42 must distinguish reliably a voltage change of seventy-six microvolts, for a reference voltage of five volts. If noise or other factors make this impractical or unnecessary, one can reduce the number of resistors in the ladder network and still obtain sufficient flexibility to meet the objective of a modularly designed system having a controller capable of handling a variety of combinations of attachments. Also, as is known specifically in the art, the conversion time is reduced if the number of bits of resolution is reduced.

One way, in accordance with the present invention, to obtain full flexibility with a reduced number of resistors in the ladder network is to assign certain resistors or groups of resistors a specific position in what amounts to a bus structure for the system. For example, if resistor 51 is only used to indicate the presence of module 22 and resistor 53 is only used to indicate the presence of module 23, then where identical sections are provided in the system, such as sections 12 and 13, one need not use additional resistors to indicate the presence of modules 25 and 24 respectively. Thus one can accommodate a greater number of different modules and a greater number of the same modules without unduly increasing the number of resistors in the ladder network.

There is thus provided by the present invention a simplified mechanism for identifying a plurality of elements in a modularly constructed system. The identification of the modules is readily accomplished and a unique signal is provided for each combination of modules. Thus a signal controller serves all possible combinations within the system, simplifying the design of the system.

Having thus described the invention, it will be apparent to those of skill in the art that various modifications can be made within the spirit and scope of the present invention. For example, while illustrated in FIG. 2 as resistances, it is understood that any suitable impedance element may be utilized. For example, resistances 51-54 can comprise coils in a relay, i.e. inductances. Further, the lack of modules or certain illegal combinations of modules can be sensed by either the master controller or fixed logic associated with the analogue to digital conversion.

I claim:

1. A system for sensing the presence of peripheral modules comprising:
   analogue encoding means, connected to one or more of said peripheral modules, for producing a unique signal in response to each combination of peripheral modules connected thereto;
   analogue to digital conversion means for converting said signal into a corresponding digital signal; and
   digital means for controlling said modules in accordance with the content of said digital signal.

2. The system as set forth in claim 1 wherein said digital means provides an error indication when said predetermined digital signal indicates that no modules are connected to said analogue encoding means.

3. The system as set forth in claim 1 wherein said analogue encoding means comprises:
   a plurality of impedance elements having one end of each connected in common and the other end of each connectable to a peripheral module;
   a source of reference voltage; and
   current to voltage conversion means interconnecting said common ends and said source of reference voltage.

4. The system as set forth in claim 3 wherein the impedance of each of said impedance elements is unique.

5. The system as set forth in claim 4 wherein the impedances are related by powers of two.

6. The system as set forth in claim 5 wherein said other ends are arranged in groups to provide standard bus connections for different modules.

* * * * *